Jan. 6, 1942.   R. F. EDGAR   2,269,149
PERMANENT MAGNET
Filed Nov. 24, 1939
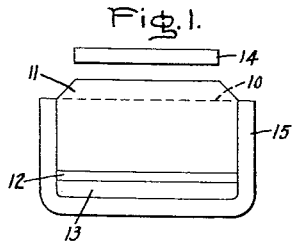
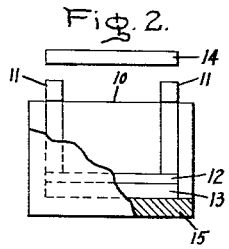
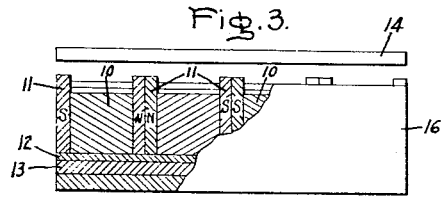
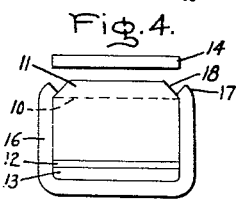
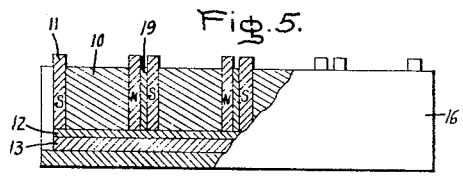
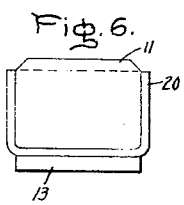
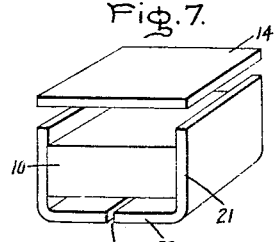
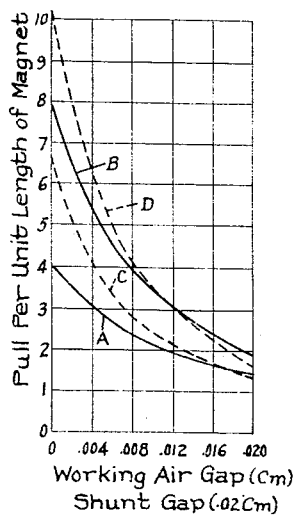
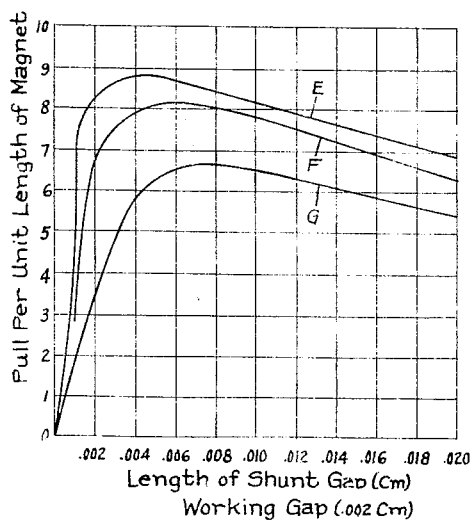
Inventor:
Robert F. Edgar,
by Harry E. Dunham
His Attorney.

Patented Jan. 6, 1942

2,269,149

UNITED STATES PATENT OFFICE 2,269,149

PERMANENT MAGNET

Robert F. Edgar, Pattersonville, N. Y., assignor to General Electric Company, a corporation of New York Application November 24, 1939, Serial No. 305,764

1 Claim. (Cl. 175—336)

This invention relates to permanent magnets and more particularly to permanent magnets of the lifting or holding type.

One of the primary objectives in a permanent magnet of the lifting or holding type is to provide maximum attractive force between the magnet poles and the movable keeper or object being attracted. In a permanent magnet application of this character the magnet may be periodically subjected to a much greater air gap than that with which it normally works. When the poles are in contact with the keeper or the object being attracted, the air gap is very small and the required magnetomotive force is likewise small. However, when the keeper is pulled away, the reluctance of the external circuit becomes much greater so that the flux density in the magnet drops to a low value. When the keeper is again put in place against the magnet poles, the flux density rises along a minor hysteresis loop but it does not rise to a value as high as could be maintained if the keeper were never pulled away. Inasmuch as the attractive force varies as the flux density squared, the net result is a marked reduction in the holding power or attractive force of the magnet.

I have found that magnets having soft iron pole pieces to concentrate the flux at the contact surface combined with a leakage path of high conductance or low reluctance are very sensitive to an air gap at the contact surface and that the pull may be varied over a wide range by varying the ratio of length to cross section of the magnet material, by varying the relative value of leakage conductance, and by varying the area of the contact surface. By providing a fixed shunt flux path of somewhat greater reluctance than the working flux path to carry the flux when the magnet is open-circuited, that is, when the armature or keeper is moved away from the magnet, maximum attractive force is obtained between the magnet poles and the armature or keeper since the arrangement gives a higher flux density at the contact surface than would be obtained if there were no low reluctance leakage path. This shunt path in parallel with the useful flux path bypasses only a small proportion of the total flux since its air gap is several times that at the pulling surfaces but when the working armature is pulled away the fixed keeper provides a path of considerably lower reluctance than would be present without it so that the flux density does not drop to as low a point on the major hysteresis loop and the operating range is along a minor hysteresis loop at considerably higher flux densities than it would otherwise be.

It is an object of my invention to provide an improved permanent magnet.

It is another object of my invention to provide a more efficient permanent magnet of the lifting or holding type.

It is still another object of my invention to provide a permanent magnet of the lifting or holding type in which the demagnetizing influence due to removal of the keeper or object attracted to the poles of the magnet is reduced considerably below that which results in the use of magnets heretofore produced.

It is a further object of my invention to provide improved low reluctance means for directing the magnetic flux of a permanent magnet to a working air gap and for lessening the effect of removing the keeper from the magnet poles on the subsequent attractive force of the magnet.

In accordance with my invention in its preferred form I provide a short permanent magnet of high coercive force material with pole pieces constructed of highly permeable material for concentrating the flux in the working air gap. In conjunction with these pole pieces I provide a fixed air gap having a reluctance only a few times greater than that of the normal working air gap. This fixed air gap forms a shunt magnetic flux path in parallel with the working air gap. Inasmuch as its reluctance is several times greater than that of the working gap, it bypasses only a small part of the total flux. On the other hand, when the reluctance of the external circuit is increased to many times that of the working air gap such as obtains for example when the keeper or object being attracted is removed from the magnet poles, the fixed air gap in the shunt path provides a bypass for the flux from the magnet so that the flux density in the magnet is not permitted to drop to as low a value as it would if the low reluctance shunt path were not present.

These advantages may be obtained by positioning the pole pieces close together or by providing the magnet with a relatively permeable or soft iron shunt circuit containing a fixed air gap. I have found that the shunt leakage path is particularly effective when used with lifting magnets where the magnet poles are in actual contact with the armature during lifting and where the reluctance may be relatively very high with the armature removed. In this case, the shunt gap is made short enough to materially raise the flux density at the minimum point without seriously weakening the useful flux with the armature in contact.

The novel features which are characteristic of my invention are pointed out in the appended claim. My invention, however, will best be understood from reference to the following specification when considered in connection with the accompanying drawing. In the drawing, Fig. 1 illustrates an end view of one of the magnets constructed in accordance with my invention. Fig. 2 is a side elevation view of the magnet of Fig. 1 with a portion of the shell cut away. Fig. 3 is a modification of the magnet of Fig. 1 showing a sectional side elevation view of a plurality of magnets arranged for obtaining increased attractive force. Fig. 4 is an end view of Fig. 3 showing a different type of support for the magnet. Fig. 5 is a modification of Fig. 3. Fig. 6 represents still another modification in which the spacer element supports the magnet and the fixed keeper. Fig. 7 is a perspective view of a modified magnet constructed in accordance with my invention, while Figs. 8 and 9 represent characteristic curves of permanent magnets constructed in accordance with my invention.

In the construction of the permanently magnetized elements which are employed in carrying out my invention, I employ permanent magnet steels having a relatively high coercive force as compared, for example, to the old or usual form of chrome steel in which the coercive force rarely exceeds approximately 65 oersteds. As an example, I have found that alloys containing iron, nickel, and aluminum as the basic or essential ingredients, as described in United States Patents 1,947,274 and 1,968,569 to William E. Ruder, and 2,027,994 to 2,028,000 inclusive, to Tokushichi Mishima, are highly satisfactory materials for forming the permanent magnets used with my invention. If desired, however, the magnet composed of the aforementioned alloy may be formed by a sintering process as disclosed in a copending application, Serial No. 196,691, Patent No. 2,192,743, filed March 18, 1938, to Goodwin H. Howe, entitled "Sintered permanent magnet," and assigned to the same assignee as the present invention. Magnets made from such alloys exhibit a very high coercive force and a residual induction of approximately 7500 gausses. Inasmuch as it is the coercive force which determines the ability of a permanent magnet to resist demagnetization, magnets made from such materials may consequently be made much shorter in length than those made from low coercive force materials and such magnets will maintain their magnetism almost indefinitely without appreciable diminution. Consequently, a maximum amount of magnetic energy is obtained from a given volume of magnetic material, so that for a particular application less magnetic material will be required.

Referring to the drawing, Figs 1 and 2 disclose a holding magnet having a short permanent magnet element 10 positioned between two pole pieces 11 which may be conveniently constructed of a relatively high permeability material such as soft iron. I provide a fixed air gap between the poles of the magnet and a stationary or fixed keeper in order to maintain a higher flux density and thereby improve the operating characteristics of the magnet. In the arrangement illustrated this comprises a non-magnetic spacer element 12 which is positioned against the pole pieces 11 and which separates the pole pieces from a highly permeable fixed keeper element 13 for example, of soft iron. This spacer element 12 may conveniently be constructed of a suitable non-magnetic material such as brass, for example. The numeral 14 designates a movable keeper element or an object being attracted.

I provide means for maintaining the magnet, the non-magnetic spacer, and the fixed keeper in relatively fixed relation. In accordance with the illustrated embodiment of Figs. 1 and 2, this includes a casing or shell 15 of a suitable non-magnetic material, such as for example as a synthetic resin composition, for instance a phenolic resin composition. With this type of construction, the various elements may be held together and molded or cast in place in the plastic material.

In Figs. 3 and 4, I have shown an arrangement employing a plurality of permanent magnets whereby the attractive force may be adjusted to the desired value for a particular application. In this arrangement the permanent magnets are arranged between the pole pieces in a manner similar to Figs. 1 and 2 and they are arranged in parallel relation with like poles of the magnets and corresponding pole pieces of like polarity confronting each other so that the magnets form a common pole at their junction. As a result the projecting pole pieces are alternately of N and S polarity. With this arrangement the separate magnet elements 10 with their pole pieces 11 are preferably magnetized and protected with a keeper before being assembled together. As described in connection with Figs. 1 and 2, a non-magnetic spacer element 12 spaces the permeable keeper element 13 from the magnet poles and thus forms a shunt leakage path of low reluctance for the magnet elements.

The non-magnetic casing or shell 16 which maintains the various elements in fixed relation may be of the same material as that described in connection with the magnet of Figs. 1 and 2, but I have shown a modification which may be employed, if desired. In the arrangement illustrated I employ a channel member of cast or formed aluminum or other suitable non-magnetic material. By bending the upper edge 17 of the casing slightly to engage the inclined surfaces 18 of the pole pieces 11, I provide a simple means for securing the parts in relatively fixed relation. Instead of the formed aluminum piece 16 for holding the parts together, the magnet blocks 10 with their pole pieces 11, the spacer element 12, and the keeper 13 may be placed in a mold and cast in aluminum. Pressure casting may be employed. Another alternative would be to use die casting metal and make the parts an integral part of a die casting.

In Fig. 5 I have shown a modification of Fig. 3 which likewise employs a plurality of permanent magnets for increasing the attractive force to satisfy the requirements of a particular application where more than one magnet is necessary. In the arrangement illustrated a non-magnetic spacer element 19 of brass, for example, is positioned between the adjacent pole pieces of the magnets. With this construction the permanent magnet elements 10 are all magnetized in the same direction. A non-magnetic spacer element 12 is likewise employed between the pole pieces and the permeable fixed keeper element 13 to provide a shunt path of low reluctance for maintaining the flux density in the magnet when the keeper or armature 14 is off or removed from the poles 11. A casing element 16 may likewise be employed for holding the elements firmly in position. With this construction the magnets may be magnetized all at the same time after they have been placed in position, simply by forcing the flux through the magnets in series and across the spacer elements 19.

In Fig. 6, I have shown a modified arrangement whereby a spacer element 20, which is conveniently constructed of a non-magnetic material such as brass, is also utilized to hold the parts together. When this construction is employed, the brass spacer element 20 may be soldered to the magnet, the soft iron pole pieces 11 and the fixed keeper element 13.

Instead of using the spacer element 12 and the fixed keeper 13 at the bottom of the magnet as illustrated in the foregoing figures, the pole may be extended downward a short distance beyond the magnet and bent toward each other in the same plane to form a small air gap. Fig. 7 illustrates such an arrangement in which the permeable pole pieces 21 extend beyond the magnet and have their end portions bent toward each other as at 22 to form the air gap 23. The principle of operation does not differ from that of the other embodiments already described.

The advantages of my invention are well exemplified in the field of luminaires where permanent magnets are sometimes employed for maintaining the canopy and lamp globe in place, such for example as illustrated by the United States Patent No. 2,147,482 to H. E. Butler, assigned to the same assignee as the present invention. For this application the magnets may be attached to a ring of non-magnetic material which can be sprung around the upper edge of the lamp globe. An iron ring forming the keeper element is attached to the glass canopy so that when the canopy is placed on the globe, the ring makes contact with the magnets and is held firmly in place. The magnets may be molded or cast into an aluminum or other non-magnetic ring or they may be soldered to a brass ring. Other means of attachment will readily occur to those skilled in the art. With this construction the canopy may be moved for cleaning the parts, replacing the lamps, etc., without producing any appreciable decrease in the holding power of the magnet.

I should like to emphasize that magnets constructed in accordance with my invention are most effective when the cycle of reluctance through which the magnet must operate covers a wide range, and particularly when the minimum reluctance, which occurs while the magnet delivers useful flux, is very low.

Fig. 8 illustrates characteristic curves of magnets of different lengths arranged in a magnetic circuit similar to Figs. 1 and 2 according to the principles of my invention. The curves show variation of pull per unit length of the permanent magnet element with length of the working air gap (in centimeters) where the fixed or shunt gap when employed is maintained constant at 0.02 cm. The permanent magnet element employed comprised a magnet of 1 cm. square cross section positioned between two soft iron pole pieces of 0.25 sq. cm. cross-section. Curves A and C show variations in pull without the use of a fixed keeper for permanent magnet elements of 0.5 and 0.3 cm. length, respectively, while curves B and D are characteristic curves for the same magnets, respectively, using a fixed or shunt gap of 0.02 cm.

In Fig. 9 I have illustrated still other curves which show the variation of pull per unit length of the magnet element with length of gap in the shunt or leakage path, the working gap being maintained constant at 0.002 cm. In each case the magnet element and each pole piece contact surface were of the same cross sectional area as the magnet described in connection with Fig. 8. The curves E, F, and G correspond to magnet lengths of 0.2, 0.3, and 0.5 cm. respectively.

Inspection of the curves at once indicates the marked incerase in pull per unit length of magnet in each instance where a fixed keeper element is employed over that obtainable with the same arrangement omitting the low reluctance shunt leakage path. The pull per unit length being a criterion of efficiency in the utilization of magnetic material, it is at once apparent that the use of a shunt flux path, having an air gap several times as great as the working air gap but much less than the maximum air gap resulting when the armature is removed from the magnet, represents a distinct advance in the art of permanent magnets.

While I have described the principle of operation of my invention together with the apparatus which I now consider to represent the best embodiments thereof, it will be obvious to those skilled in the art that changes and modifications may be made without departing from my invention, and I, therefore, aim in the appended claim to cover all changes and modifications as fall within the true spirit and scope of my invention.

What I claim as new and desire to secure by Letters Patent of the United States is:

A permanent magnet assembly having a plurality of permanent magnet elements arranged in spaced relation with their magnetic axes substantially in alignment, an armature element to be attracted by said permanent magnet elements, and a keeper element, the adjacent poles of said magnet elements being of opposite polarity, a relatively permeable pole piece in engagement with each polar face of each of said permanent magnets, a nonmagnetic spacer element positioned between said adjacent pole pieces of said permanent magnets, said keeper constituting a shunt flux path and comprising a single fixed magnetic element extending substantially the full length of said magnetic assembly and being formed of relatively permeable material and spaced from said pole pieces to form a flux path whose magnetic reluctance is substantially greater than the reluctance of the magnetic circuit including said pole pieces and said armature when said armature is in the operative position, and whose reluctance is substantially less than the reluctance of the magnetic circuit including said pole pieces and said armature when said armature is in the pulled-away position with respect to said pole pieces.

ROBERT F. EDGAR.